Patented May 8, 1923.

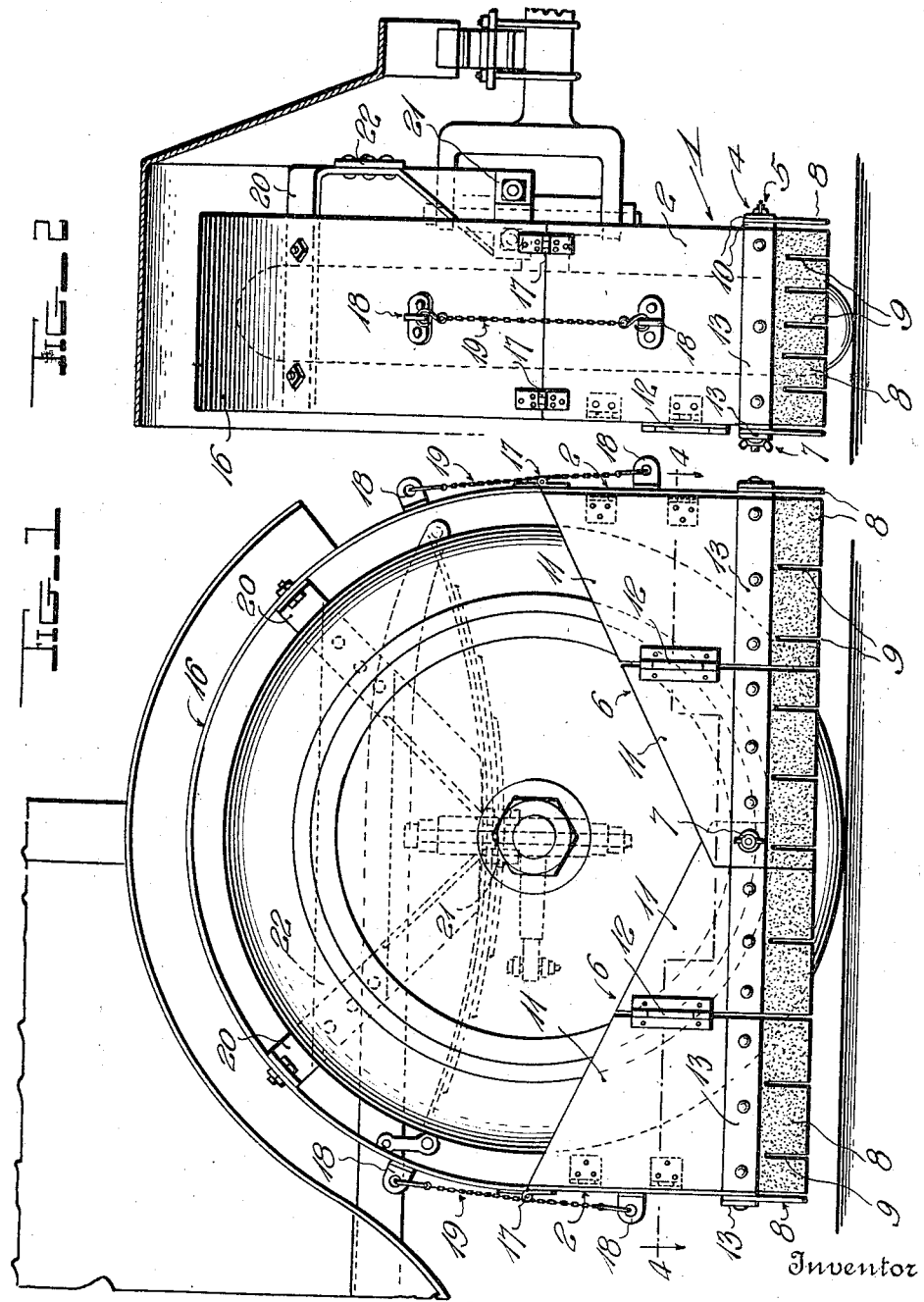

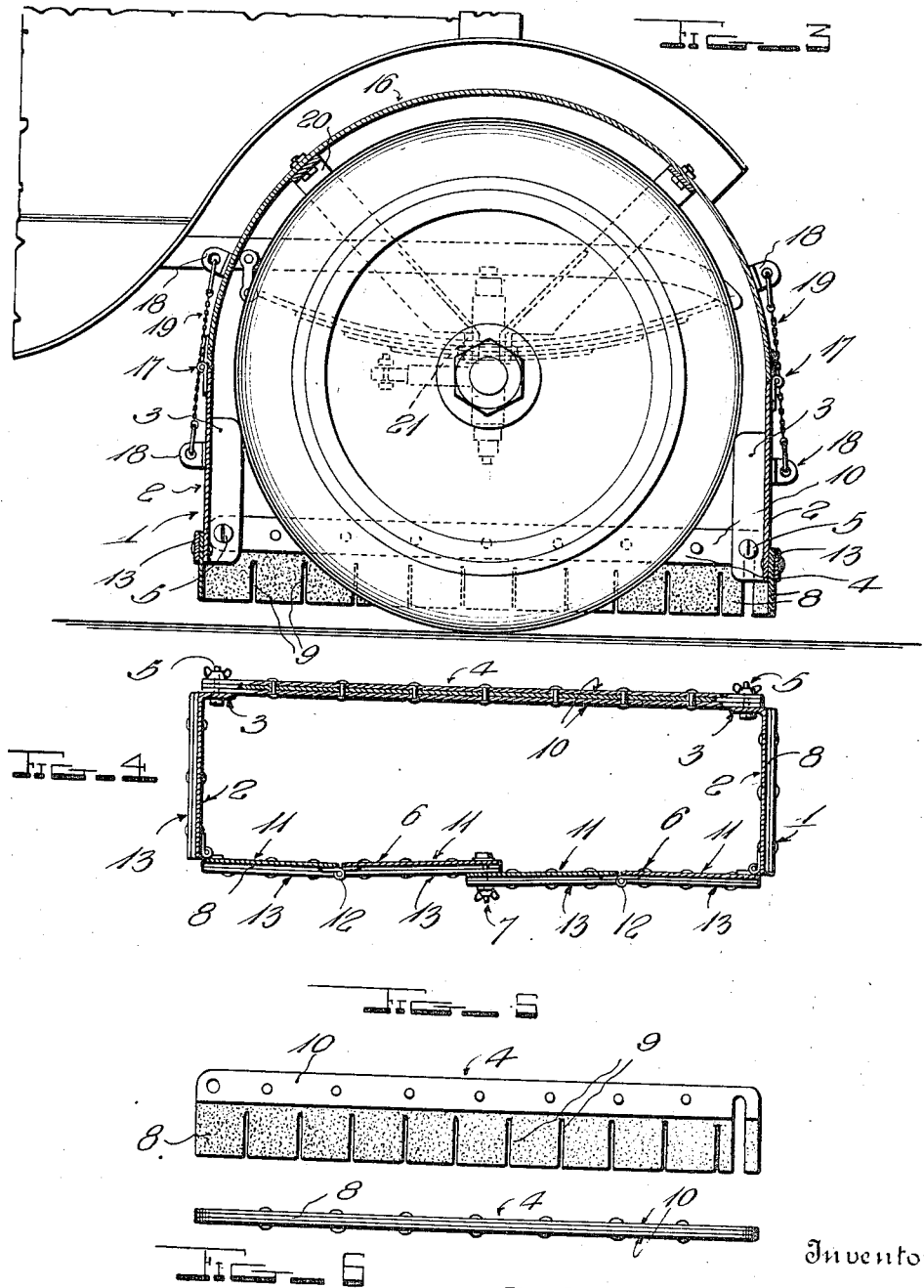

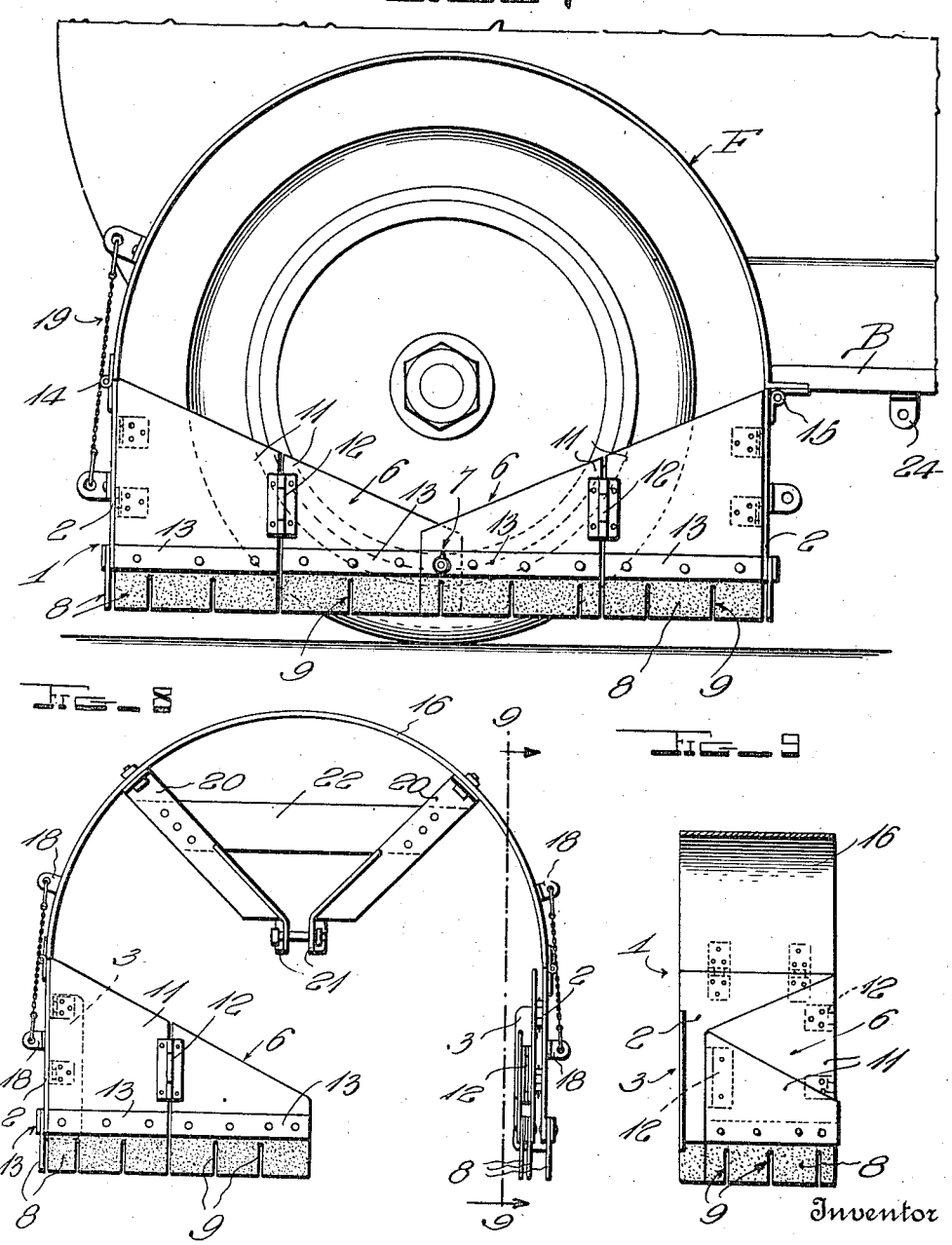

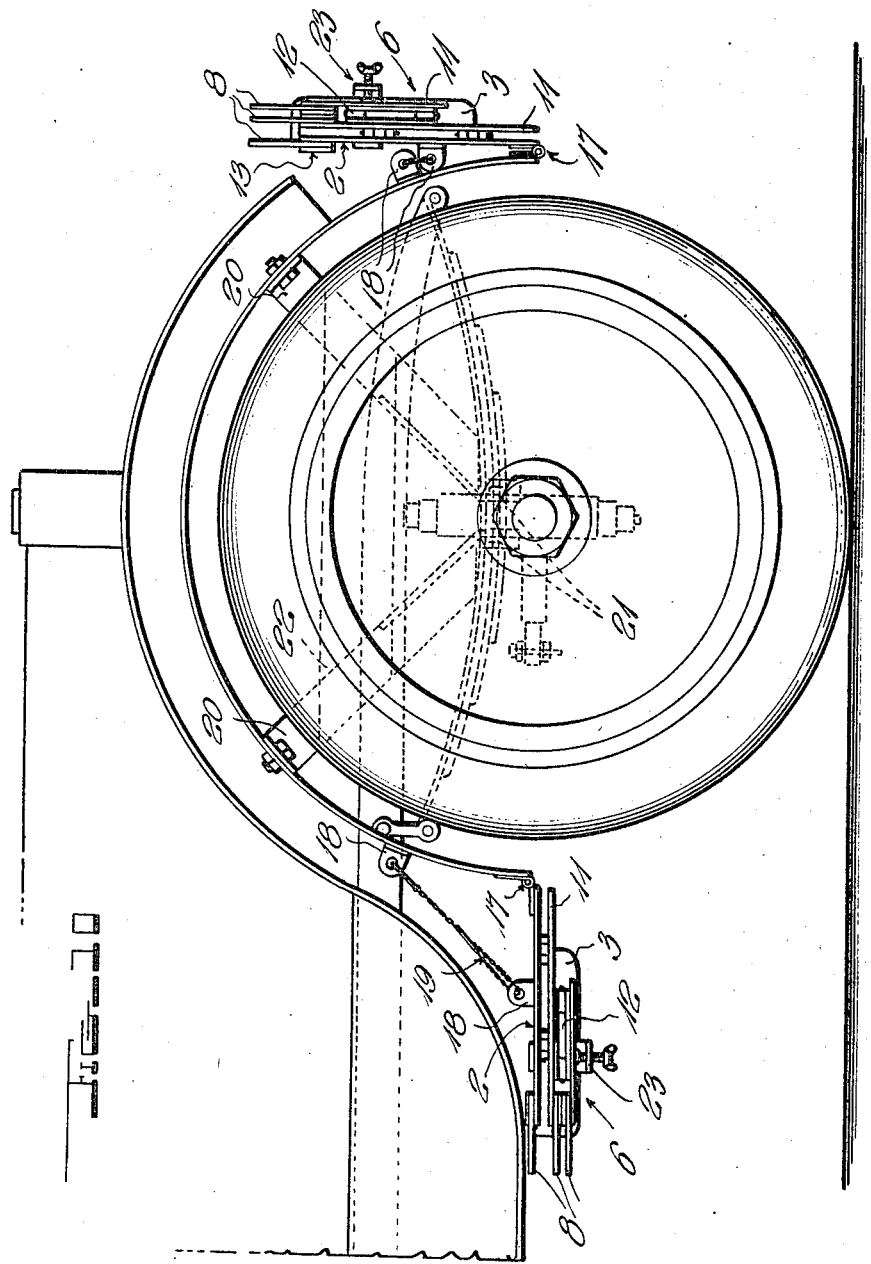

1,454,738

UNITED STATES PATENT OFFICE.

THOMAS HILTON, OF WALPOLE, MASSACHUSETTS.

MUD GUARD.

Application filed March 9, 1922. Serial No. 542,315.

*To all whom it may concern:*

Be it known that I, THOMAS HILTON, a citizen of the United States, residing at Walpole, in the county of Norfolk and State of Massachusetts, have invented certain new and useful Improvements in Mud Guards; and I do declare the following to be a full, clear, and exact description of the invention, such as will enable others skilled in the art to which it appertains to make and use the same.

This invention relates to an improved mud guard which is designed for co-action with the lower portion of a vehicle wheel just above the ground to prevent splashing of mud and water onto nearby pedestrians.

The principal object of the invention is to generally improve upon guards of this class by providing one of extreme simplicity and durability which is such in construction that it can be applied to practically all types of vehicles without requiring any alteration of the existing parts.

Another object is to provide a guard which is such in construction that a portion thereof is retractable and designed to be moved away from the wheel to permit access to be had to the latter for making repairs or removing and applying tires.

A further object of the invention is to so construct the guard that the retractable portions are capable of folding into close proximity to the arched mud guard to provide a compact package for handling and shipping.

Another object of the invention is to provide an improved mud guard which is preferably in the form of a frame designed to surround the lower portion of the automobile wheel, there being associated with the same, an apron formed of suitable flexible material and having a number of vertical slits formed therein to provide a plurality of relatively movable fringes designed to move freely, and prevent accumulation of an undue quantity of mud and water thereon.

A still further object of the invention is to provide a guard of this class which is such as to effectively accomplish the ends sought, the same embodying among other details of construction, novel means for attaching it to the steering knuckles of an automobile whereby to permit the guard to turn with the front wheels.

Other objects and advantages of the invention will be apparent during the course of the following description.

In the accompanying drawings forming a part of this specification and in which like numerals are employed to designate like parts throughout the same:

Figure 1 is a side elevational view of a mud guard constructed in accordance with the invention showing the same attached to one of the front wheels of an automobile.

Figure 2 is an end elevation of Fig. 1.

Figure 3 is a central longitudinal vertical sectional view through the front guard.

Figure 4 is a horizontal section taken substantially on the plane of the line 4—4 of Fig. 1.

Figure 5 is a detail elevational view of one of the detachable parts of the guard.

Figure 6 is a top plan view of said part.

Figure 7 is an elevational view of the form of guard attached to the rear wheels.

Figure 8 is an elevational view of the front guard detached and showing one of the hinged sections retracted and folded.

Figure 9 is a section taken on the line 9—9 of Fig. 8.

Figure 10 is a view like 1 showing the retractable portions folded and held in an out-of-the-way position.

In its preferred form, the improved guard comprising a substantially rectangular frame, designated generally by the numeral 1, the same being designed to entirely surround the lower portion of a vehicle wheel and be spaced slightly above the surface of the ground to effectively prevent splashing of mud and water from the wheel onto nearby pedestrians. Broadly speaking, the frame has its outer side portion constructed so as to permit it to be retracted. Consequently, repairs to the wheel and adjacent parts or removal and application of the tire will be facilitated by such an arrangement and it will obviate the necessity of detaching the guard from the vehicle as would ordinarily be required with inventions of this type with which I am familiar. Specifically speaking, the improved frame comprises spaced end plates 2. As seen in Figure 4, one edge of each plate is inturned as at 3 to reinforce the frame and to provide attaching means for a detachable side-member 4 which is bolted or otherwise detachably connected with these flanges as indicated at 5. It may be conveniently pointed out here that in many instances autoists will not desire to utilize a frame which is entirely rectangular as shown in Fig. 4. Therefore, I provide the detachable side 4 which may or may not be used. Its use will greatly add to the effectiveness of the device in that it will prevent much mud and water from being splashed onto the underframe and adjacent parts of the automobile. Referring now to the opposite or outer side of the frame which has been before described as being retractable, it will be seen that in carrying out this end, the side is simply formed of duplicate sections 6 which are hinged to the end plates 2, each section itself being composed of hinged parts 11 adapted to fold upon one another and to be swung away from the wheel to permit access to be had thereto. As seen in Fig. 4, the hinged sections 6 overlap and a suitable removable fastening 7 is employed for holding the sections in such position.

As before indicated, an apron formed of flexible sheets of material 8 is connected with the lower part of the frame to cover that portion of the wheel not covered by the frame and to prevent interference of the guard with the travel of the vehicle by striking obstructions in the road. By carefully examining this apron it will be seen that each of the strips, which is preferably of rubber, is provided with a plurality of closely spaced slits 9, thereby forming a fringed edge for the apron. Such a construction is particularly advantageous in that the several fringes are permitted to flex and to move freely with respect to one another so as to shake off mud and water which would otherwise deposit on and cling to the apron.

Referring again to the detachable side 4 of the frame, it will be seen that this is constructed of spaced resilient metal strips 10 riveted or otherwise secured together, the aforesaid flexible strips 8 forming a part of the apron being clamped between these strips. As for the opposed retractable sections of the frame, each one is formed of a pair of plates 11 hinged or otherwise pivotally connected as at 12, these plates being decreased in height toward the center of the frame and there being a narrow strip 13 employed for securing the rubber apron strips to these plates. Similar retaining strips are also employed for connecting the other rubber strips to the aforesaid end plates 2, these strips being designated by the same reference characters.

The part of the invention so far described is sufficient to provide a complete guard for attachment to the rear wheels of automobiles and the like and by directing attention to Figure 7 it will be seen that in applying the guard, the frame simply surrounds the rear wheel and is hinged or otherwise connected with the car fender F and running board B as indicated at the point 14 and 15 respectively. A different form of guard however is required for attachment to the front wheel of vehicles, because it is essential to have the guards turn with the wheels to insure that the results sought will be effectively accomplished, regardless of whether or not the vehicle is turning around a corner or traveling in a straight path. I therefore direct attention to Figure 8 which clearly illustrates the additions necessary to adapt the invention for use on front wheels. In this figure it will be seen that a curved plate or arched mud guard 16 is provided, the same being hingedly or otherwise connected at its opposite ends as indicated at 17 to the aforesaid frame 1. It will be noted that the frame and guard are equipped with apertured lugs 18 and short chains 19 having hooks at their opposite ends are designed for co-action with these lugs, the hooks being engaged with the apertures in the latter. Of course, if the chains are too long, they can be passed through the apertures and the hooks engaged with the desired links. The chains primarily function to increase the rigidity of the structure and tend to prevent undue relative movement between the frame and guard. However, they may be utilized for holding the aforesaid hinged sections of the frame 6 folded as clearly shown in Fig. 10. It may be conveniently stated here that U-clamps 23 are used to hold the hinged parts of the side-sections together when they are folded.

In order to connect the device with part of the steering gear to permit the same to turn with the wheels, I simply make use of attaching means or a bracket which is detachably bolted or otherwise connected with the underface of the aforesaid arch. Hence, it can be removed after the device is detached from the wheel and a compact package formed for shipping and storing. This bracket may be of any other construction, but in its preferred form it comprises divergent depending arms 20 having their lower ends directed laterally inward as indicated at 21 to permit them to be clamped or otherwise connected with the steering knuckle of the automobile as clearly illustrated in Figs. 1 and 2. If desired, a brace 22 for the arms 20 may be utilized. It is of course understood that the construction of the attaching bracket will vary for different makes of automobiles and the one shown is merely for the purpose of illustration.

From the foregoing description it is understood that in both forms of the invention there is a frame having retractable portions for permitting access to be had to the tire and wheel. However, the form applied to the rear wheel simply comprises the frame with the flexible apron and means for attaching it to the existing parts of the machine, the car fender itself being the equivalent of the arch which constitutes a part of the form of the invention designed for attachment to the front wheel. The guard enables the device to be conveniently connected with the automobile steering knuckle and it is advantageous also in that it collects a considerable quantity of mud which would ordinarily be thrown against the under side of the car fender, thereby making it considerably more convenient in removing the mud from the arch rather than from the car fender itself.

It is yet to be pointed out, that if desired, an eye 24 may be secured to the underside of the running board (see Fig. 7) to permit the adjacent chain to be connected with it for suspending the retractable side section 6 and end piece 2 beneath it.

Before closing it is thought well to again direct attention to Fig. 8 which shows the front guard detached with one of the side-sections 6 folded. This view illustrates the position of said section before it is swung up with the end 2 against or close to the arch. The other section is to be likewise folded for providing a very compact package. The guard is left in position at all times unless it is desired to take it off during a dry season.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A mud guard of the class described embodying mounting means capable of being disposed in an out-of-the-way position, and means extending across the outer side of the lower portion of the wheel to prevent splashing of mud on pedestrians, said means comprising a pair of hinged sections, and each section being itself composed of hinged parts capable of being folded upon each other and against the aforesaid mounting means.

2. A mud guard of the class described comprising a frame to surround the lower portion of a vehicle wheel, an arched guard designed to extend over the wheel beneath the automobile fender, said arched guard being hingedly connected at its opposite ends to said frame, and means carried by said arched guard for connecting the device to a part of the automobile steering mechanism, whereby to permit all parts to turn with the wheel.

3. A mud guard of the class described comprising a substantially rectangular frame designed to surround the lower portion of an automobile wheel, the outer side of said frame being composed of hinged sections, a flexible fringed apron cooperative with the lower portion of the frame and wheel, an arched guard designed to overlie the wheel, said arched guard being hingedly connected at its opposite ends with said frame, and means carried by said arched guard for connecting the device to a part of the automobile steering mechanism, whereby to cause the device to turn with the automobile wheels.

4. A mud guard of the class described comprising a substantially rectangular frame designed to surround the lower portion of an automobile wheel to prevent mud from being splashed from the latter onto pedestrians, said frame being composed of end members to which hinged and foldable side members are pivotally connected, and a rigid bar connected at its opposite ends to said end members to retain the latter in adjusted positions, and a mud guard designed to overlie the vehicle wheels, the end members of said frame being hingedly connected to the opposite ends of said guard.

In testimony whereof I have hereunto set my hand.

THOMAS HILTON.